US008804501B2

(12) United States Patent
Csaszar et al.

(10) Patent No.: US 8,804,501 B2
(45) Date of Patent: Aug. 12, 2014

(54) LINK FAILURE RECOVERY METHOD AND APPARATUS

(75) Inventors: Andras Csaszar, Budapest (HU); Gabor Enyedi, Bekescsaba (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 599 days.

(21) Appl. No.: 12/669,442

(22) PCT Filed: Jul. 16, 2007

(86) PCT No.: PCT/EP2007/057322
§ 371 (c)(1),
(2), (4) Date: Apr. 13, 2010

(87) PCT Pub. No.: WO2009/010090
PCT Pub. Date: Jan. 22, 2009

(65) Prior Publication Data
US 2010/0189113 A1 Jul. 29, 2010

(51) Int. Cl.
*H04L 12/26* (2006.01)
*H04L 12/56* (2006.01)
*H04L 12/24* (2006.01)
*H04L 12/70* (2013.01)

(52) U.S. Cl.
CPC .......... *H04L 45/28* (2013.01); *H04L 41/0654* (2013.01); *H04L 45/22* (2013.01); *H04L 41/0681* (2013.01); *H04L 47/12* (2013.01); *H04L 2012/5627* (2013.01)
USPC .......... 370/227; 370/217; 370/218; 370/225; 370/228

(58) Field of Classification Search
None
See application file for complete search history.

(56) References Cited

U.S. PATENT DOCUMENTS

| 6,065,061 | A | 5/2000 | Blahut et al. |
| 7,385,917 | B1 * | 6/2008 | Mo et al. ................. 370/216 |
| 7,702,810 | B1 * | 4/2010 | Pan et al. ................. 709/242 |
| 2002/0009083 | A1 * | 1/2002 | Ambe et al. ............. 370/390 |
| 2003/0185209 | A1 * | 10/2003 | Lee ......................... 370/390 |
| 2004/0109687 | A1 * | 6/2004 | Park et al. ................ 398/57 |
| 2005/0013321 | A1 | 1/2005 | Jeong et al. |

(Continued)

OTHER PUBLICATIONS

Thaler, D. et al. Multipath Issues in Unicast and Multicast Next-Hop Selection. Network Working Group: RFC 2991. Nov. 2000.

(Continued)

*Primary Examiner* — Faruk Hamza
*Assistant Examiner* — Andrew Oh (57) ABSTRACT

A method of routing packets across a packet switched network domain, comprising a multiplicity of nodes. Each node comprises an ingress interface and an egress interface. For each destination node a default and a detour branching are defined, each specifying a route to the destination node. For each two-edge connected node the default and detour branchings do not share a common ingress interface. Each node operates as an intermediate node receiving a packet at an ingress interface, identifying an egress interface based upon the ingress interface upon which the packet is received and the packet destination, forwarding the packet via that egress interface if the connected link is available and, if the connected link is not available, forwarding the packet via an alternative egress interface associated with said detour branching if the packet was received at an ingress interface associated with said default branching or dropping the packet if the packet was received at an ingress interface associated with said detour branching.

13 Claims, 5 Drawing Sheets

(56) References Cited

U.S. PATENT DOCUMENTS

| | | | |
|---|---|---|---|
| 2005/0063311 | A1 | 3/2005 | Sekiguchi |
| 2005/0063382 | A1* | 3/2005 | Fenner .................. 370/389 |
| 2005/0105519 | A1 | 5/2005 | Koppol |
| 2005/0108401 | A1* | 5/2005 | Gonda .................. 709/227 |
| 2005/0195815 | A1 | 9/2005 | Chaudhuri |
| 2006/0126496 | A1 | 6/2006 | Filsfils et al. |
| 2006/0126502 | A1 | 6/2006 | Vasseur et al. |
| 2006/0155872 | A1 | 7/2006 | Charzinski et al. |
| 2006/0164975 | A1 | 7/2006 | Filsfils et al. |
| 2006/0193248 | A1 | 8/2006 | Filsfils et al. |
| 2006/0221813 | A1* | 10/2006 | Scudder et al. ............. 370/216 |
| 2007/0041550 | A1* | 2/2007 | McLarty et al. ......... 379/211.02 |
| 2007/0086361 | A1 | 4/2007 | Allan et al. |
| 2007/0098006 | A1* | 5/2007 | Parry et al. ............... 370/437 |
| 2008/0062986 | A1* | 3/2008 | Shand et al. ............... 370/392 |
| 2008/0232247 | A1* | 9/2008 | Evans et al. ............... 370/228 |
| 2008/0232347 | A1* | 9/2008 | Chao et al. ............... 370/351 |
| 2008/0259913 | A1* | 10/2008 | Shah et al. ............... 370/386 |
| 2010/0226310 | A1* | 9/2010 | Kuparinen et al. ............. 370/328 |

OTHER PUBLICATIONS

Atlas. Loop-Free Alternates for IP/LPD Local Protection. Internet Draft, draft-ietf-rtgwg-ipfrr-spec-base-00. Mar. 2005.

Bryant, S. et al. IP Fast Reroute Using Tunnels. Internet Draft, Network Working Group; draft-bryant-ipfrr-tunnels-02. Apr. 2005.

Bryant, S. et al. IP Fast Reroute Using Not-via Addresses. Internet Draft, Network Working Group; draft-ietf-rtgwg-ipfrrnotvia-addresses-00. Dec. 2006.

Nelakuditi, S. et al. Fast Local Rerouting for Handling Transient Link Failures. Transactions on Networking, available online: http://arena.cse.sc.edu/papers/fir.ton.pdf. Dec. 2006.

Edmonds, J. Edge-disjoint Branchings. Combinatorial Algorithms (1973).

Tarjan R. E. Edge-Disjoint Spanning Trees and Depth-First Search. Inf Proc. Letters (1974).

Lovasz, L. On Two Minimax Theorems in Graph Theory. Journal of Combinatorial Theory (1976).

* cited by examiner

LINK FAILURE RECOVERY METHOD AND APPARATUS

TECHNICAL FIELD

The present invention relates to an Link failure recovery method and apparatus and in particular to such a method and apparatus which avoids routing loops.

BACKGROUND

A typical Internet Protocol (IP) network comprises a set of IP routers each having one or more ingress interface and one or more egress interfaces (typically, for duplex links, a single interface will act both as ingress and egress interface). Each interface is attached to a link which carries packets between routers. A link may be for example an Ethernet link, optical link, etc. Within a router, each ingress interface is part of a so-called line card. This line card connects the interface to the internal backplane of the node. Each line card has a memory storing a routing table sometimes referred to as forwarding table. A routing table stores for each destination IP address prefix an egress interface. When a packet is received at an ingress interface of a router, the corresponding line card uses its routing table to determine from the IP Address prefix the egress interface over which the packet should be sent. Conventionally, a routing table is computed by software running at an IP router, with the same table being provided to each line card of that router.

Failures of IP links within an IP network can be fairly common. A failure may result due to failure of a link itself, or due to failure of a node at the other end of a link. Various fault recovery procedures are in use to mitigate the effects of link failures. Typically, these rely upon a router detecting a failure in respect of a link to which the router is directly connected. The router then "floods" the change of link state as a protocol message to all its neighbours, which in turn also flood the link state update to all their neighbour until all network routers learn about the topology change. After learning the change of link state, either by direct detection or by being informed via a signaling message, each router re-computes its routing table to provide alternative routes (if available) which avoid the failed link. The re-computed table is passed to each line card at the router. Each IP router of the network re-computes its own routing table. Examples of such conventional protocols include Open Shortest Path First (OSPF) and Intermediate System-to-Intermediate System (IS-IS).

It takes a significant time for a fault detection at one IP router to propagate to other routers with a network and to effect the routing tables used by the line cards at those other routers due to link transmission delays and to the time taken to recompute the routing tables and store these in the link cards. Even though an individual router (e.g. the one that detects the failure) might update its routing table quickly, this will not be effective until other routers have similarly recomputed their routing tables. In the meantime, packets can be dropped and service levels reduced.

In an attempt to mitigate these problems, a new IP Fast Reroute (IPFRR) framework (see references [1] to [5] below) has been proposed. The object of IPFRR framework is to allow individual routers to quickly re-route packets onto pre-computed alternative paths after local detection of a link failure, and prior to sending out failure notifications to neighbouring nodes according, for example, to OSPF. Transient link errors are thus extremely short and most packets can reach their destination. In addition, network reconfiguration can be delayed until it is determined that the link failure is persistent.

One specific IPFRR procedure is described in reference [4] below. This is known as "Not-via Addresses". This procedure provides 100% link fault recovery for at most one failed link. However, Not-via-Addresses requires tunneling and the provision of two IP addresses per interface. In the case of a densely connected network, the administration and management of tunneling interfaces and their addresses can be cumbersome.

Figure 1:
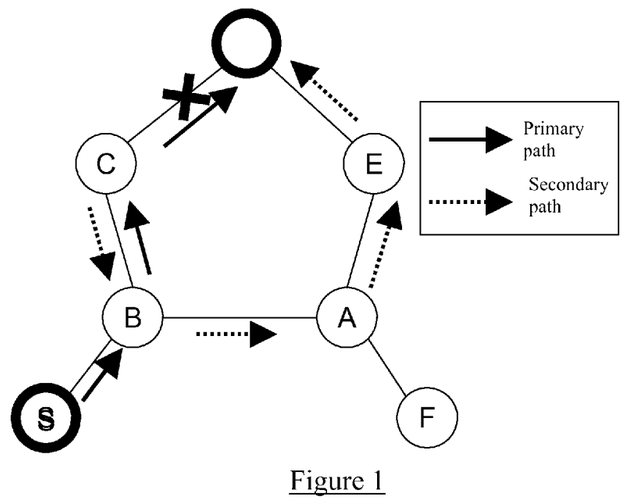
FIG. 1 illustrates schematically a seven router network displayed as a graph, and employing Failure Insensitive Routing to recover from a single failed link.

A problem that should always be addressed in IP networks is loop formation. This results in packets being transferred around a loop without ever reaching their final destination. Loops occupy valuable network bandwidth and result in dropped packets. Another IPFRR procedure is known as Failure Insensitive Routing (FIR) (see reference [5]) and specifically aims to reduce the risk of loop creation after a local and fast-reroute, without having to rely on tunnels. Routing tables are provided at each router on a per line card basis. That is to say that the egress interface to which incoming packets are sent is determined not only by the destination (IP address), but also by the ingress interface on which the packet is received. Referring to FIG. 1, a seven router IP network is illustrated. Consider for example router B. A first routing table associated with the ingress interface attached to router S is configured to cause packets received at that interface and having an IP address routing prefix mapping to router D, to be forwarded to router D across the B-C link. However, a second routing table associated with the ingress interface to router C is configured to forward packets received at that interface and having the same routing prefix, to be forwarded to router D across the B-A link.

Referring again to FIG. 1, consider the case where router S sends a packet destined for router D. The solid arrows illustrate the optimal route, i.e. S→B→C→D. Now consider what happens when the link between C and D fails. Upon detection of this failure, router C will return packets received from router B, to router B. As these packets are received by router B at a different ingress interface from which they were received in the "outgoing" leg, despite the fact the destination IP address routing prefix is the same, router B will forward the packet over a different egress interface, namely the interface to router A. Thereafter, packets sent from S to D follow the path S→B→C→B→A→E→D (where the additional legs are illustrated by the dashed arrows in FIG. 1). Of course, at some point the OSPF (or other) protocol will cause the routing tables to be updated across the network, resulting in a new optimal route S→B→A→E→D. In the interim, however, no packets will be dropped.

Figure 2:
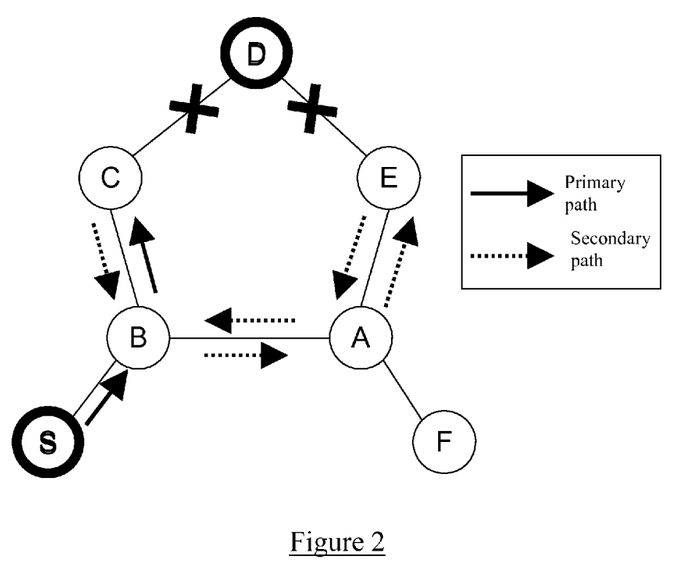
FIG. 2 illustrates the network of FIG. 1, with Failure Insensitive Routing giving rise to a loop as a result of the failure of two links.

Loop creation in FIR is still possible however. This is illustrated in FIG. 2. Consider that the C-D link has failed as described with respect to FIG. 1, and that packets are being sent between C and D along the S→B→C→B→A→E→D route. Consider further that the link between E and D now fails. Router E will begin returning packets to router A which will in turn route them to B. Router B will pass packets to C which will return them to B and so on.

Rerouting and loop-prevention techniques are also described in: WO 2006107875, WO 2006065439, WO 2006093642, WO 2006065440, US 20050063311, WO 2004019565, and U.S. Pat. No. 6,065,061.

It is noted that link failure and looping problems may arise in other, non-IP packet switched networks, for example in Ethernet networks.

SUMMARY

Loop creation occurs in FIR because FIR always seeks to use the shortest path for forwarding, given the available links.

However, if an interface based routing method could always determine whether a packet is following a default path or if it is on a detour because of a fault, it would be possible to drop the packets when the second error occurs.

According to a first aspect of the present invention there is provided a method of routing packets across a packet switched network domain, the network domain comprising a multiplicity nodes each of which comprises at least one ingress interface and at least one egress interface. The invention is applicable in particularly, to IP networks comprising IP routers and to Ethernet networks comprising Ethernet switches. For each node as destination, a default branching and a detour branching are defined, each of which specifies a route from each other node to the destination node, where, for each node which is two-edge connected, the default and detour branchings do not share a common ingress interface. For a packet flow being sent from a source to a destination node, for each node operating as an intermediate node, the following steps are carried out:

receiving a packet at an ingress interface, identifying an egress interface based upon the ingress interface upon which the packet is received and the packet destination, forwarding the packet via that egress interface if the connected link is available and, if the connected link is not available, forwarding the packet via an alternative egress interface associated with said detour branching if the packet was received at an ingress interface associated with said default branching or dropping the packet if the packet was received at an ingress interface associated with said detour branching.

Embodiments of the invention provide fault tolerance in so far as they define a detour branching from source node to destination node in the event of a single link failure in the default branching. Switching from the default branch to the detour branch is fast as it is a per node decision. Furthermore, in the event of a failure of a link in the detour branching, a node detecting the link failure implicitly knows that a packet is following the detour branching, based on the ingress interface (or source address) and the packet destination, and can drop the packet accordingly. Additional interface addresses and tunneling are not required.

In order to construct default and detour branchings, for each single edge connected node within the network, a virtual edge is included in one of said default and detour branchings, the default edge corresponding to the real edge.

In the case that unused links remain after creation of the default and detour branchings, these unused links may be added to the default and/or detour branching, providing the loop creation is avoided.

At each node, for each ingress interface, a routing table may define for each other destination node, an egress interface over which received packets should be forwarded. There are a number of ways in which the routing tables may be defined and allocated. For example, the same routing table may be provided to each ingress interface within a given node, the routing table mapping ingress interface identifiers and destination addresses to egress interface identifiers. In the case that the same routing table is provided to each ingress interface within a given node, the routing table may map source addresses and destination addresses to egress interface identifiers. Alternatively, different routing tables may be provided to each ingress interface within a given node.

According to one embodiment of the invention, for each routing table, where the ingress interface and a destination node map to a default branching, the table may specify an egress interface associated with the default branching and a fallback egress interface associated with said detour branching and, where the ingress interface and a destination node map to said detour branching, the table may specify an egress interface associated with the detour branching and no fallback egress interface.

According to a second aspect of the present invention there is provided a node for use in routing packets across a packet switched network domain. The invention is applicable in particular to node operating as IP routers. The node comprises:

at least two ingress interfaces and at least two egress interfaces;

means for determining, for each node as destination, a default branching and a detour branching across the network, each of which specifies a route from each other node to the destination node, where, for each node which is two-edge connected, the default and detour branchings do not share a common ingress interface;

means for receiving a packet at an ingress interface;

means for identifying an egress interface based upon the ingress interface upon which the packet is received and the packet destination, means for forwarding the packet via that egress interface if the connected link is available and, if the connected link is not available, for forwarding the packet via an alternative egress interface associated with said detour branching if the packet was received at an ingress interface associated with said default branching or dropping the packet if the packet was received at an ingress interface associated with said detour branching.

DETAILED DESCRIPTION

Figure 3:
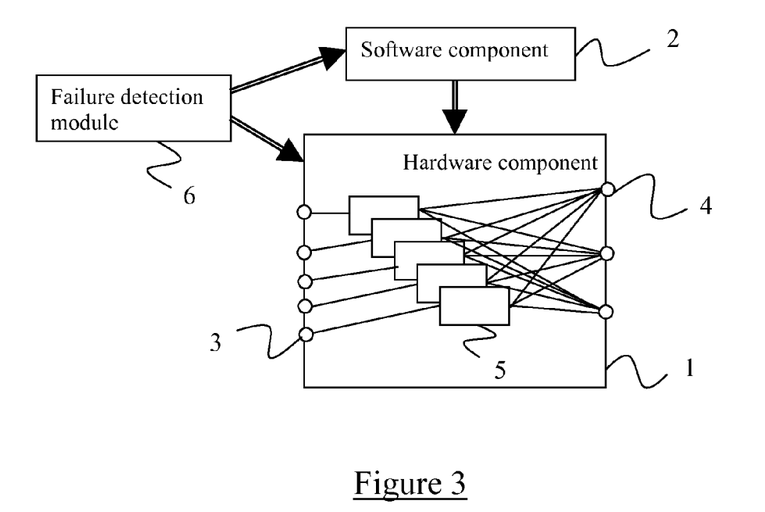
FIG. 3 illustrates schematically a router of an IP network.

As is well known, ingress interfaces at IP routers are implemented by way of respective line cards, with each line card being configured with a routing or forwarding table. A typical router is illustrated in FIG. 3 and comprises a hardware component 1 and a software component 2. The software component is arranged to determine routing tables based upon pre-configured data and dynamic updates, e.g. based upon link availability. The hardware component comprises a plurality of ingress interfaces 3 and a plurality of egress interfaces 4. Each ingress interface is couple to a line card 5, and each line card stores a routing table provided by the software component. The line card selectively couples the ingress interfaces to the egress interfaces. A separate failure detection module 6 monitors link availability at the ingress and egress interfaces, and reports to the software and hardware modules.

The IPFRR based procedure described here is referred to as Loop-Free Failure Insensitive Routing (LFIR) and relies upon the identification of paths from each router (within an IP network) to each other destination router (within that same network) in such a way that when a router receives a packet from a specific ingress interface, the router can always decide, based upon the configured routing table, if either the default path was used or the packet is on a detour due to a failed link. If the (onward) detour also fails, the packet must be dropped. There is no requirement for tunneling or additional flags as the path (default or detour) can be determined solely from the ingress interface on which a packet is received, and the packet's destination.

Underlying Theory

An examination of Graph theory is helpful in arriving at a solution. In particular, the theorem presented in reference [6] teaches that a branching (spanning arborescence) rooted at vertex d in digraph G is a spanning tree directed in such a way that each vertex $x \neq d$ has one edge going out. (Note that branchings are usually defined in the reverse direction.). A 2-edge-connected digraph is one in which the cutting of two (or more) edges will disconnect at least one vertex from all other vertices. It is trivial to observe that, in the case of a 2-edge-connected digraph, it is possible to find two edge-disjoint branchings in this graph rooted at any $d \in N(G)$.

One may observe that a branching is equivalent to a routing path for a given destination d; if a packet can follow the directed edges of a branching rooted at d it reaches the destination. For the purposes of a theoretical analysis, the bidirectional links of real networks must be considered as two directed links. That is, if link $\{i,j\}$ is part of the real network, then the algorithm will work with two directed links: (i,j) and (j,i). It can be easily proven that the so constructed graph is also 2-edge-connected.

Considering further a 2-edge-connected network, network set-up involves the following pre-computation steps:

1. Convert the undirected graph of the original network G to a digraph G'
2. Find two edge-disjoint branchings in G' rooted at d for all $d \in N(G')$.
3. For each destination, label the two branchings (1 and 2).

Once set-up, packets arriving at a router are handled as follows:

1. When sending a packet from a source (first hop), use the first branching if possible.
2. When a packet arrives at a router, determine the next hop from the incoming interface and the destination address.
3. If the next-hop is reachable, forward it to that next hop.
4. If the next-hop is not reachable, determine whether that next hop follows branching 1 or 2, then:
5. If the next hop follows branching 1, forward the packet to the next hop following branching 2, or
6. If the next hop follows branching 2, drop the packet.

Figure 4:
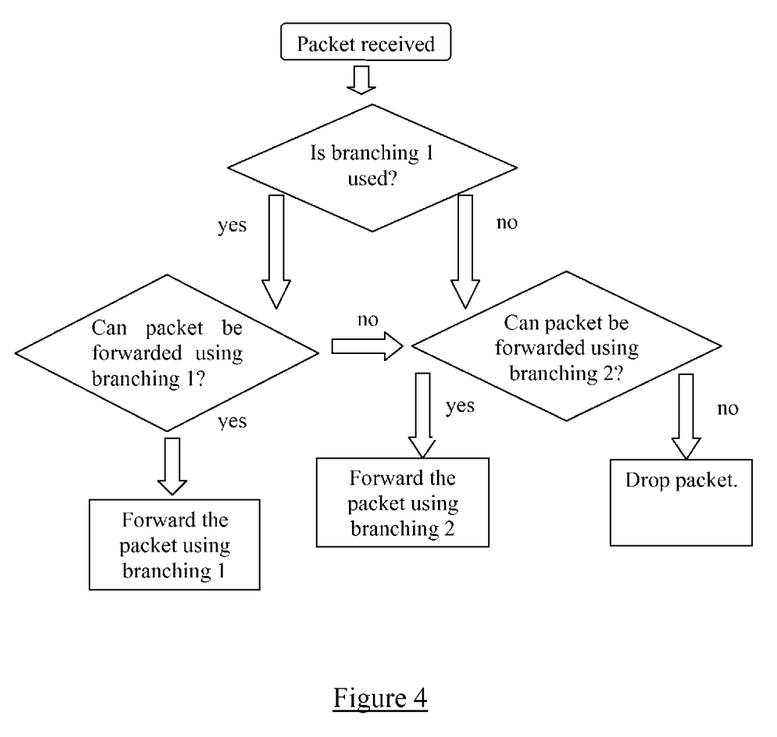
FIG. 4 is a flow diagram illustrating a procedure for avoiding loop creation in Failure Insensitive Routing.

FIG. 4 is a flow diagram illustrating the routing process implemented at each IP network router.

Branching Determination

It should be apparent from the above discussion that the key to LFIR is an effective algorithm for finding branchings, i.e. the alternative routes. [Note that the required branchings are directed towards the destination, not away from it. This may require the reversal of known branching determination algorithms.] A known fast algorithm has been proposed by Tarjan, see reference [7]. This requires $O(e\alpha(e,n))$ time, where $e=|E(G)|$, $n=|N(G)|$, and $\alpha(e,n)$ is a very slowly growing function related to the inverse of Ackerman's function. An alternative algorithm has been proposed by Lovász, see reference [8]. This algorithm is simpler and also fast, it takes only $O(e^2)$ steps to find two branchings with breadth first search. More importantly however, Lovász's algorithm allows application of a heuristic to decrease the length of the paths in the primary branching (used as the default path, i.e., when there are no errors): the directed edge from the set of edges that can be added to the arborescence is always chosen, as this provides the shortest path to the target of this edge. Using binary heap with this heuristic, $O(e^2 \log e)$ time is needed.

Bridges

An undirected graph can be partitioned into z disjunct "components", such that these components are 2-edge-connected. Naturally, it is possible that some components contain only one vertex. If the removal of a link causes the network to split into two parts, it means that this link is a "bridge" between two 2-edge-connected components. A bridge cannot be protected against failure; if it fails, there is no alternative link It is also true that if vertices s and d are not in the same 2-edge-connected component, there is only one edge-disjoint path between them. Using this idea it is possible to improve the LFIR procedure by duplicating the bridges virtually in the graph of the network. This new graph is 2-edge-connected, so after the transformation to a directed graph there will be at least two edge-disjoint branchings. Packets can follow these branchings as before. If a packet following a branching crosses a bridge, then the node after the bridge cannot decide which branching was used, so it should assume branching 1 for the next forwarding. This improved method can correct all link failures except for a bridge failure. If it is not sure that the network is at least 2-edge-connected, it is needed to find the bridges. Bridges can be found as described in reference [7] in a time $O(e\alpha(e,n))$.

Using LFIR in a Distributed Environment

Using OSPF or IS-IS link state database, every router has a consistent view of the network topology but every router must find the same two branchings. Lovász's branching search algorithm is deterministic except for the case when there is more than one edge with the same distance from the root during the edge selection. In this case, each router must possess the same tie breaking rule to determine which edge will be chosen. The generic way to solve this is to give a unique priority to all links, and to always choose the link with the highest priority. In this way the construction of a branching is fully deterministic, so if routers have the same information about the network the same routing will be calculated. Link priorities can be administratively set priorities, or they can correspond to the addresses of interfaces connected to links, with the higher or lower address having the higher priority.

Implementation of the forwarding tables in real routers relies on a capability to assign different forwarding tables to different interfaces. The process is as follows.

If an edge $\{i,j\}$ is part of branching 1, then the forwarding table of the corresponding incoming interface of node j contains the primary next-hop based on branching 1, and a backup entry based on branching 2.

If a link $\{i,j\}$ is part of branching 2, then the forwarding table of the corresponding incoming interface of node j contains only the primary next-hop based on branching 2, and there will be no backup entries installed.

Like other IPFRR solution, the present proposal assumes that routers possess some means to quickly detect the unreachability of a next-hop, i.e. the down state of an outgoing interface. In practice this is solved by lower layer triggers or by dedicated Hello protocols, like BFD. When a neighbour or outgoing interface is found to be down, a process has to quickly invalidate all entries in the routing tables pointing to this interface. If the link was part of branching 1, then removing it will still leave the backup entry in the forwarding table.

If it was part of branching 2 for a destination, the only route entry will be removed from the table and packets following branching 2 will be dropped.

Multiple-Edge Connected Networks

If a network is more than 2-edge-connected, i.e. n-edge connected (where n>2), LFIR can also be used. Naturally an n-edge-connected network is 2-edge-connected as well, so (at least) two branchings can be found. If a link fails, LFIR can correct this error as described above, so the network can still transport the traffic and all the nodes have sufficient time to recognise the error. If the new topology is known in all the nodes, the two branchings can be computed again—because the network is still at least 2-edge-connected—and the system is ready to correct further failures.

Broadcast Links

Some links in a network may be broadcast links instead of point-to-point links. For example, an Ethernet "segment" may connect more than two routers. In this case the incoming interface cannot be mapped to a specific router. To resolve this situation, it is possible to set up for each pair of routers, a separate virtual LAN (VLAN) which needs virtual interfaces in both routers. In this way, the virtual interfaces can be directly mapped to a neighbouring router. Another option is not to make a differentiation based on the local incoming interface ID but on the lower layer source address of the neighbour, e.g., on the MAC address of the neighbouring router in case of an Ethernet segment, i.e.:

| Source MAC address | Destination IP prefix | Outgoing inteface |
|---|---|---|
| 12-87-45-67-A9-7B | 10.6.0.0/16 | Eth3 |
| ... | ... | ... |

Multiple Paths

In traditional shortest path routing, Equal Cost Multi Paths (ECMP) are often used for load sharing purposes. If, after finding the two disjoint branchings, there are some (directed) links that have not been used by either branching, it is possible to add these links for load sharing purposes to the primary branching given that it will not violate the DAG (directed acyclic graph) property of the primary branching, i.e. if it will not cause a routing loop. If there still remain some links that are not added to either branching, they can be added to the secondary branching for load sharing purposes given that this will not violate the DAG (directed acyclic graph) property of the secondary branching.

Figure 5:
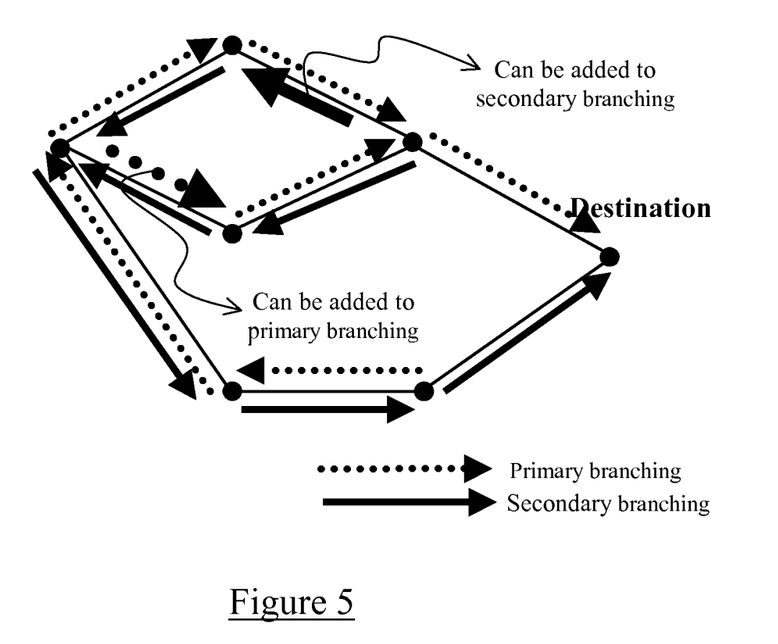
FIG. 5 illustrates schematically the addition of multiple paths when creating branchings for use in the process of FIG. 4.

This addition of multiple paths to the primary and secondary branchings is illustrated in FIG. 5. As will be apparent from FIG. 5, if in a traditional network a router has n available ECMP paths to a destination, i.e., n outgoing alternative links, at least one of these links will be used by the primary branching, and another one for the secondary branching. The remaining (n−2) alternatives can be added to the primary branching as these will not violate the DAG property. This way, the proposed forwarding mechanism can also chose among at least (n−1) outgoing interfaces if there are no link failures. Of course, the proposal is advantageous over ECMP as not only the shortest alternative paths can be added to the primary branching, but also each link which does not cause a loop.

Loop Prevention During Global Convergence

The teachings in this invention disclosure are to be used for fast re-route in case of transient link failures. If the link failure is subsequently corrected, the system can again use the primary branching. In some cases however, the topology changes by administrative input (e.g. addition a new node) or the failure is persistent requiring global re-convergence. Network wide re-convergence, i.e., when routers one-by-one recalculate their forwarding tables, may cause transient routing loops. The proposed forwarding mechanism does not change this in any respect and it may still occur.

Illustrative Example

Figure 6:
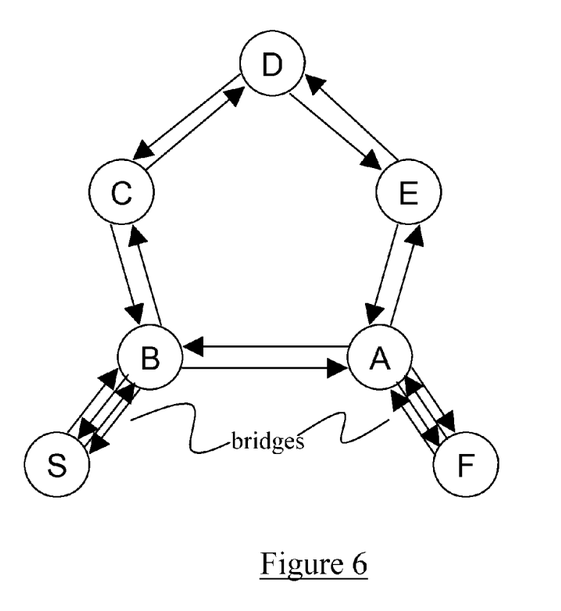
FIG. 6 illustrates schematically edges in a seven router network for use in branching determination.

FIG. 6 shows a simple seven router network represented as a graph. Routers A to E are two edge connected, i.e. having bi-directional links to two neighbouring routers. Routers S and F have bidirectional connections to only a single neighbouring router. The respective links therefore represent bridges as described above. In order to determine a default and a detour branching (for each destination router) it is therefore necessary to create for each of S and F a second virtual bridge, as illustrated.

Figure 7:
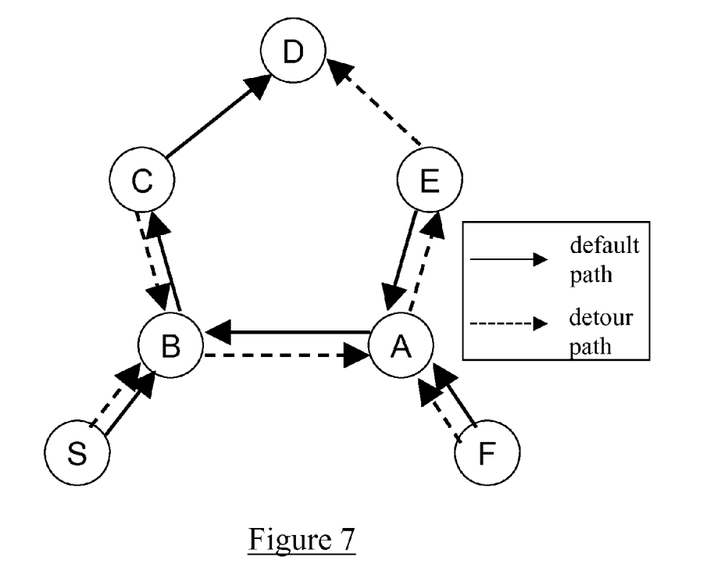
FIG. 7 illustrates default and detour branchings within a seven router network.

Application of Graph theory allows the default and detour branchings to be identified within the network of FIG. 6, although in this example the process is trivial. Considering router D as the destination router, the two branchings are shown in FIG. 7, with the default branching being shown with solid lines and the detour branching being shown with dashed lines. It can be seen that every other router can reach router D by either the default branching or the detour branching.

To illustrate the loop prevention afforded by LFIR, assume that router S is sending packets to router D, initially via the default branching. Packets will follow the path S→B→C→D. In the event that the link C-D fails, router C will detect this and will begin returning packets received from B, to D, according to the detour branching. Thus, packets will now follow the route S→B→C (default branching)→B→A→E→D (detour branching). Assume further that the link E-D now fails. The routing table at E associated with the ingress interface from A will record that, for packets destined for D, that ingress interface belongs to the detour path. No fallback route is contained within the routing table and the packets arriving from A will be dropped, i.e. the packets are not returned to A and no loop results. Of course, packets sent by S will not reach D until such time as one of the failed links, C-D and E-D, recovers.

It will be appreciated by the person of skill in the art that various modifications may be made to the above described embodiments without departing from the scope of the invention. For example, whilst the invention has been exemplified above with reference to IP networks, the invention is also applicable to Ethernet networks in which packet forwarding is handled by Ethernet switches.

REFERENCES

1. D. Thaler: Multipath issues in unicast and multicast next-hop selection. Internet Engineering Task Force: RFC 2991 (November 2000)
2. Alia Atlas: Loop-free alternates for ip/ldp local protection. Internet Draft, available online: http://tools.ietf.org/html/draft-ietf-rtgwg-ipfrr-spec-base-00 (March 2005)
3. S. Bryant, C. Filsfils, S. Previdi, M. Shand: IP Fast-reroute Using Tunnels. Internet Draft, available online: http://tools.ietf.org/html/draft-bryant-ipfrr-tunnels-02 (April 2005)
4. S. Bryant, M. Shand, S. Previdi: IP Fast Reroute Using Not-via Addresses. Internet Draft, available online: http://www.ietf.org/internet-drafts/draft-ietf-rtgwg-ipfrr-notvia-addresses-00.txt (December 2006)
5. S. Nelakuditi, S. Lee, Y. Yu, Z.-L. Zhang, C-N. Chuah: Fast Local Rerouting for Handling Transient Link Failures. Accepted for publication in IEEE/ACM Transactions on Networking, available online: http://arena.cse.sc.edu/papers/fir.ton.pdf (December 2006)

6. J. Edmonds: Edge-disjoint branchings. Combinatorial Algorithms (1973) 91-96
7. R. E. Tarjan: Edge-disjoint spanning trees and depth-first search. Inf. Proc. Letters (1974) 51-53
8. L. Lovász: On two minimax theorems in graph theory, Journal of Combinatorial Theory (1976) 96-103

The invention claimed is:

1. A method of routing packets across a packet switched network domain, the network domain comprising a plurality of nodes, wherein the plurality of nodes includes a source node, a destination node, and one or more intermediate nodes, and wherein each node in the plurality of nodes comprises at least one ingress interface and at least one egress interface, the method comprising:
    for the destination node, defining a default branching and a detour branching, each of which specifies a route from each node other than the destination node to the destination node; and
    performing the following at each node operating as an intermediate node for a packet flow being sent from the source node to the destination node, wherein each intermediate node in said plurality of nodes is a two-edge connected node in which the default branching and the detour branching do not share a common ingress interface, and wherein each two-edge connected node is connected to at least two adjacent nodes via a plurality of communication links:
        receiving a packet at an ingress interface, wherein the packet is sent to a packet destination,
        identifying an egress interface based solely upon the ingress interface upon which the packet is received and the packet destination, without a requirement for a routing flag,
        forwarding the packet via the identified egress interface if a connected link connecting the intermediate node to an adjacent node coupled to the identified egress interface is available,
        if the connected link is not available, rerouting the packet via an alternative egress interface associated with the detour branching if the packet was received at an ingress interface associated with the default branching, and
        if the connected link is not available, dropping the packet if the packet was received at an ingress interface associated with the detour branching.

2. The method according to claim 1, wherein for each single edge connected node within the network domain, a virtual edge is included in one of the default branching and the detour branching, the default edge corresponding to the real edge.

3. The method according to claim 1, further comprising, after the step of defining a default branching and a detour branching, adding any unused links to at least one of the following: the default branching; and the detour branching.

4. The method according to claim 1, further comprising: providing at each node, for each ingress interface, a routing table defining, for each node other than the destination node, an egress interface over which received packets should be forwarded.

5. The method according to claim 4, wherein the same routing table is provided to each ingress interface within a given node, the routing table mapping ingress interface identifiers and destination addresses to egress interface identifiers.

6. The method according to claim 4, wherein the same routing table is provided to each ingress interface within a given node, the routing table mapping source addresses and destination addresses to egress interface identifiers.

7. The method according to claim 4, further comprising: providing different routing tables to each ingress interface within a given node.

8. The method according to claim 4, further comprising: for each routing table, where the ingress interface and the destination node map to the default branching, specifying in the routing table an egress interface associated with the default branching and a fallback egress interface associated with the detour branching and, where the ingress interface and the destination node map to the detour branching, specifying in the routing table an egress interface associated with the detour branching and no fallback egress interface.

9. The method according to claim 1, wherein the packet switched network domain is an Internet Protocol (IP) network domain, and the nodes are IP routers.

10. The node according to claim 1, wherein the packet switched network domain is an Ethernet Network domain, and the nodes are Ethernet switches.

11. An intermediate node for use in routing packets across a packet switched network domain that contains a plurality of nodes, wherein the plurality of nodes includes a source node, a destination node, and one or more intermediate nodes, wherein a default branching and a detour branching are defined across the network domain for the destination node, wherein each of the default branching and the detour branching specifies a route from each node other than the destination node to the destination node, and wherein each intermediate node comprises at least two ingress interfaces and at least two egress interfaces, wherein each intermediate node is configured to perform the following for a packet flow being sent from the source node to the destination node:
    receive a packet at an ingress interface, wherein the packet is sent to a packet destination, and wherein each intermediate node is a two-edge connected node in which the default branching and the detour branching do not share a common ingress interface, and wherein each two-edge connected node is connected to at least two adjacent nodes via a plurality of communication links;
    identify an egress interface based solely upon the ingress interface upon which the packet is received and the packet destination, without a requirement for a routing flag;
    forward the packet via the identified egress interface if a connected link connecting the intermediate node to an adjacent node coupled to the identified egress interface is available;
    if the connected link is not available, reroute the packet via an alternative egress interface associated with the detour branching if the packet was received at an ingress interface associated with the default branching; and
    if the connected link is not available, dropping the packet if the packet was received at an ingress interface associated with the detour branching.

12. The intermediate node according to claim 11, wherein the intermediate node is an Internet Protocol (IP) router for use within an IP network domain.

13. The intermediate node according to claim 11, wherein the intermediate node is an Ethernet switch for use within an Ethernet network domain.

* * * * *

UNITED STATES PATENT AND TRADEMARK OFFICE
CERTIFICATE OF CORRECTION

PATENT NO. : 8,804,501 B2  
APPLICATION NO. : 12/669442  
DATED : August 12, 2014  
INVENTOR(S) : Csaszar et al.

It is certified that error appears in the above-identified patent and that said Letters Patent is hereby corrected as shown below:

On the Title Page

Item (75), under "Inventors", in Column 1, Line 2, delete "Bekescsaba" and insert -- Békéscsaba --, therefor.

Item (57), under "ABSTRACT", in Column 2, Line 3, delete "comprises" and insert -- comprise --, therefor.

In the Specification

In Column 1, Line 6, delete "an link" and insert -- a link --, therefor.

In Column 4, Line 22, delete "destination," and insert -- destination; --, therefor.

In Column 4, Line 53, delete "As is" and insert -- As it is --, therefor.

In Column 5, Line 38, delete "G'" and insert -- G'. --, therefor.

In Column 6, Line 17, delete "link It" and insert -- link. It --, therefor.

In Column 7, Line 32, delete "inteface" and insert -- interface --, therefor.

In Column 9, Line 6, delete "96-103" and insert -- 96-103. --, therefor.

In the Claims

In Column 10, Line 19, in Claim 10, delete "node" and insert -- method --, therefor.

Signed and Sealed this  
Second Day of June, 2015

Michelle K. Lee  
*Director of the United States Patent and Trademark Office*